United States Patent
Pattabhiraman et al.

(10) Patent No.: US 12,083,875 B2
(45) Date of Patent: *Sep. 10, 2024

(54) INTEGRATED TONNEAU COVER FOR A VEHICLE

(71) Applicant: TESLA, INC., Palo Alto, CA (US)

(72) Inventors: Arvind Pattabhiraman, San Francisco, CA (US); Jared Migdal, San Francisco, CA (US); Paul Venhovens, San Francisco, CA (US); Greg Peer, San Francisco, CA (US); Dhruv Kapoor, San Francisco, CA (US); Alan Paul Clarke, San Francisco, CA (US)

(73) Assignee: Tesla, Inc., Austin, TX (US)

(*) Notice: Subject to any disclaimer, the term of this patent is extended or adjusted under 35 U.S.C. 154(b) by 761 days.

This patent is subject to a terminal disclaimer.

(21) Appl. No.: 16/953,091

(22) Filed: Nov. 19, 2020

(65) Prior Publication Data

US 2021/0155086 A1    May 27, 2021

Related U.S. Application Data

(60) Provisional application No. 62/938,596, filed on Nov. 21, 2019.

(51) Int. Cl.
    *B60J 7/08*       (2006.01)
    *B60J 10/88*      (2016.01)
    (Continued)

(52) U.S. Cl.
    CPC .............. *B60J 7/085* (2013.01); *B60J 10/88* (2016.02); *B60R 16/033* (2013.01);
    (Continued)

(58) Field of Classification Search
    CPC ......... E05F 15/60; E05F 15/603; B60J 10/80; B60J 10/86; B60J 10/88; B60J 7/02;
    (Continued)

(56) References Cited

U.S. PATENT DOCUMENTS 1,950,927 A * 3/1934 McMillan
4,717,196 A * 1/1988 Adams
(Continued)

FOREIGN PATENT DOCUMENTS

| AU | 2018208776 B1 * | 9/2019 | .............. B60J 7/068 |
| CN | 110395096 A * | 11/2019 | .............. B60J 7/085 |

(Continued)

OTHER PUBLICATIONS

Wang, "Pickup automatic opening and closing carriage cover system", Published: Nov. 1, 2019, Edition: CN110395096A (Year: 2019).*

(Continued)

*Primary Examiner* — Dennis H Pedder
(74) *Attorney, Agent, or Firm* — Schwegman Lundberg & Woessner, P.A.

(57) ABSTRACT

A truck bed cover integrated in a vehicle (e.g., a truck), configured to move through an opening formed between a cab and a truck bed, and along a set of channels on the truck bed. The vehicle includes a motor engaged with the truck bed cover and configured to enable an automated movement of the truck bed cover along the set of channels. The vehicle in one embodiment is an electric truck configured to run off a battery pack stored within the electric truck. The truck bed cover includes a plurality of movable portions, the plurality of movable portions linked together in a flexible format.

20 Claims, 5 Drawing Sheets

(51) Int. Cl.
*B60R 16/033* (2006.01)
*E05F 15/603* (2015.01)
*H02J 7/35* (2006.01)

(52) U.S. Cl.
CPC .............. *E05F 15/603* (2015.01); *H02J 7/35* (2013.01); *E05Y 2201/684* (2013.01); *E05Y 2201/688* (2013.01); *E05Y 2400/614* (2013.01); *E05Y 2400/628* (2013.01); *E05Y 2900/53* (2013.01)

(58) Field of Classification Search
CPC ..... B60J 7/04; B60J 7/041; B60J 7/067; B60J 7/141; B60J 7/1607; B60J 7/08; B60R 16/033; H02J 7/35; E05Y 2201/684; E05Y 2201/688; E05Y 2400/614; E05Y 2400/628; E05Y 2900/53; B60P 7/02; B60P 7/04
USPC ....... 296/98, 136.03, 100.01, 100.09, 100.12
See application file for complete search history.

(56) References Cited

U.S. PATENT DOCUMENTS

| | | | | |
|---|---|---|---|---|
| 4,889,381 A | * | 12/1989 | Tamblyn | B60J 7/068 296/100.09 |
| 5,251,950 A | * | 10/1993 | Bernardo | B60J 7/041 296/100.09 |
| 6,481,772 B1 | * | 11/2002 | Tenn | B60N 2/3013 296/65.01 |
| 6,908,139 B1 | * | 6/2005 | Szieff | B60J 7/041 296/37.16 |
| 9,004,571 B1 | * | 4/2015 | Bernardo | B60J 7/141 296/100.09 |
| 9,212,830 B2 | † | 12/2015 | Guillemette | |
| 9,597,995 B1 | * | 3/2017 | Weltikol | B60J 7/141 |
| 9,884,627 B1 | * | 2/2018 | Gage | F02D 41/021 |
| 10,286,763 B2 | * | 5/2019 | Capiak | B60Q 1/32 |
| 10,596,887 B2 | * | 3/2020 | Rossi | B60J 7/198 |
| 10,737,563 B2 | * | 8/2020 | Carter | B60P 7/04 |
| 11,697,332 B2 | * | 7/2023 | Bernardo | B60J 7/085 296/100.09 |
| 2015/0054300 A1 | * | 2/2015 | Shi | B60J 7/141 296/100.09 |
| 2016/0031305 A1 | * | 2/2016 | Bernardo | B60J 7/085 296/100.09 |
| 2018/0118003 A1 | | 5/2018 | Singer | |
| 2018/0126833 A1 | * | 5/2018 | Hannan | B60J 7/068 |
| 2018/0134132 A1 | * | 5/2018 | Nania | B60P 7/04 |

FOREIGN PATENT DOCUMENTS

| | | | |
|---|---|---|---|
| WO | 2018156921 | | 8/2018 |
| WO | WO 18/156921 | * | 8/2018 |
| WO | 2021102174 | | 5/2021 |

OTHER PUBLICATIONS

"European Application Serial No. 20824839.3, Notification Regarding Rule 164 and Article 94(3) EPC mailed Mar. 21, 2024", 9 pgs.

"International Application Serial No. PCT US2020 061343, International Search Report mailed Apr. 29, 2021", 5 pgs.

"International Application Serial No. PCT US2020 061343, Written Opinion mailed Apr. 29, 2021", 8 pgs.

"International Application Serial No. PCT US2020 061343, International Preliminary Report on Patentability mailed Jun. 2, 2022", 10 pgs.

\* cited by examiner
† cited by third party

INTEGRATED TONNEAU COVER FOR A VEHICLE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Technical Field

This disclosure generally relates to a vehicle, and more specifically relates to a cover for a truck bed that can be electrically rolled up and down to cover the bed.

Description

A vehicle is useful in many different ways, including having the capability to store and carry cargo. For example, for a truck (e.g., a pickup truck), has a truck bed that is useful for such storage and carrying of cargo.

However, many trucks on the market today have open truck beds that are exposed to the environment, without any covering. The lack of any covering over the truck bed leaves any cargo stored or carried in the truck bed vulnerable to weather conditions and potential security issues related to, for example, theft. Rain, snow, and even wind can result in damage to the cargo, and the lack of any covering can leave the cargo open to the public and thus at risk of theft.

In order to mitigate the possibility of such damage, many truck owners install aftermarket truck bed covers that cover the bed of their truck. However, not only may such aftermarket truck bed covers be difficult to install, they also may not fit exactly with the specifications of the truck beds of different models of trucks. If a truck bed cover does not have an accurate fit it can leak rain or snow through the gaps between the truck bed cover and the walls around the truck bed, and cause cargo damage. In addition, not only are many aftermarket truck bed covers difficult to install and inconvenient to use, but they also take up space in the truck beds and reduce the overall utility of the trucks.

SUMMARY

For purposes of summarizing the disclosure and the advantages achieved over the prior art, certain objects and advantages of the disclosure are described herein. Not all such objects or advantages may be achieved in any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

One embodiment is a vehicle having: a cab; a truck bed comprising a set of channels; a truck bed cover configured to move through an opening formed between the cab and the truck bed, and along the set of channels on the truck bed; and a motor engaged with the truck bed cover and configured to enable an automated movement of the truck bed cover along the set of channels.

Another embodiment is a truck bed cover, which includes: a plurality of movable portions, the plurality of movable portions linked together in a flexible format; wherein each one of the plurality of movable portions is linked to an adjacent movable portion by a flexible hinge; and the flexible hinge comprises a weatherstrip configured to provide the truck bed cover with a water impermeable surface once the cover is moved into a closed position.

Yet another embodiment is a truck bed cover, having: a plurality of movable portions, the plurality of movable portions having ends, and being linked together in a flexible format; a roller mounted to each of the ends through a bearing and configured to fit within a channel on a truck bed; and a flexible strip positioned adjacent to the roller and biased such that when the roller is mounted into the channel, the flexible strip biases the roller to be held within the channel.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure may be understood by reference to the following detailed description. It is noted that, for purposes of illustrative clarity, certain elements in various drawings may not be drawn to scale, may be represented schematically or conceptually, or otherwise may not correspond exactly to certain physical configurations of embodiments.

Embodiments of the invention are generally related to an automated truck bed cover that is configured to roll down over the truck bed and cover any stored contents. In one embodiment, the truck bed is known as a "tonneau" and the truck bed cover is a "tonneau cover". As described in more detail below, the tonneau cover may be made of a series of movable rigid slats that are provided with a seal between each slat so that the entire cover is relatively weatherproof once fully extended over the truck bed. In one embodiment, the cover is retracted into a rolled configuration and stored in a compartment in the lower portion of the truck, adjacent the juncture of the cab and the bed. In use, an electric motor is used to extend or retract the rolled cover over the truck bed.

In use the edges of each slat which make up the cover have one or more rollers which slide along parallel tracks running between the cab and the bed and then along the upper top edges of the bed. As the cover is extended and retracted the rollers are guided along these tracks from the lower portion of the truck to up and over the truck bed. This configuration will be more easily appreciated by reference to the figures and description mentioned below.

In one embodiment, the truck bed cover is made from a series of parallel rigid slats that are connected to one another through a flexible and water-tight linkage. The slats may be approximately 25, 30, 35, 40, 45, 50, 55, 60, 65, 70, 75, 80, 85, 90, 95, 100 or more millimeters in width and have a length that runs from one side of the truck bed to the other. The length may be, for example, 1200, 1300, 1400, 1500, 1550, 1575, 1600, 1625, 1700, 1800, 1900 or more millimeters. In one embodiment, the slat width is approximately 50 mm, and the slat length is approximately 1600 mm. In one embodiment, at each end of each slat is one or more rollers configured to fit within a set of "U" or "V" shaped tracks mounted to the upper portion of the sides of the truck bed. As the electric motor that winds or unwinds the cover is engaged, the rollers attached to each slat roll along the interior of the track to cover the truck bed. To reduce rattling or other noise as the cover is extended or retracted, and as truck drives along the road, each roller may be biased to stay firmly held against one side of the track by a flexible strip that puts pressure onto the roller to keep it pressed against the track. In one embodiment, the flexible strip is positioned above each roller to bias the roller in a downward direction and against a lower portion of the interior of the track.

Figure 2:
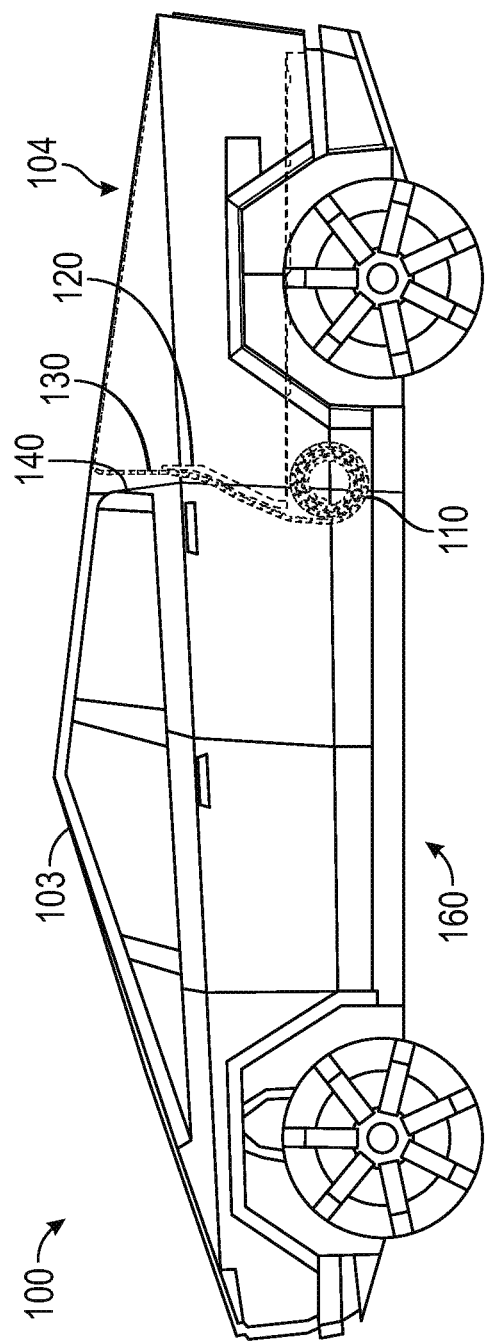
FIG. 2 shows a side transparent view of an embodiment of a truck bed cover integrated in a vehicle, according to this disclosure.

In one embodiment, the vehicle is an electric vehicle that runs off a battery pack stored on the lower portion of the truck (e.g., battery pack 160 illustrated in FIG. 2). In another embodiment the truck may be hybrid-gasoline truck or a fuel-cell powered truck or any combination thereof.

Figure 1A:
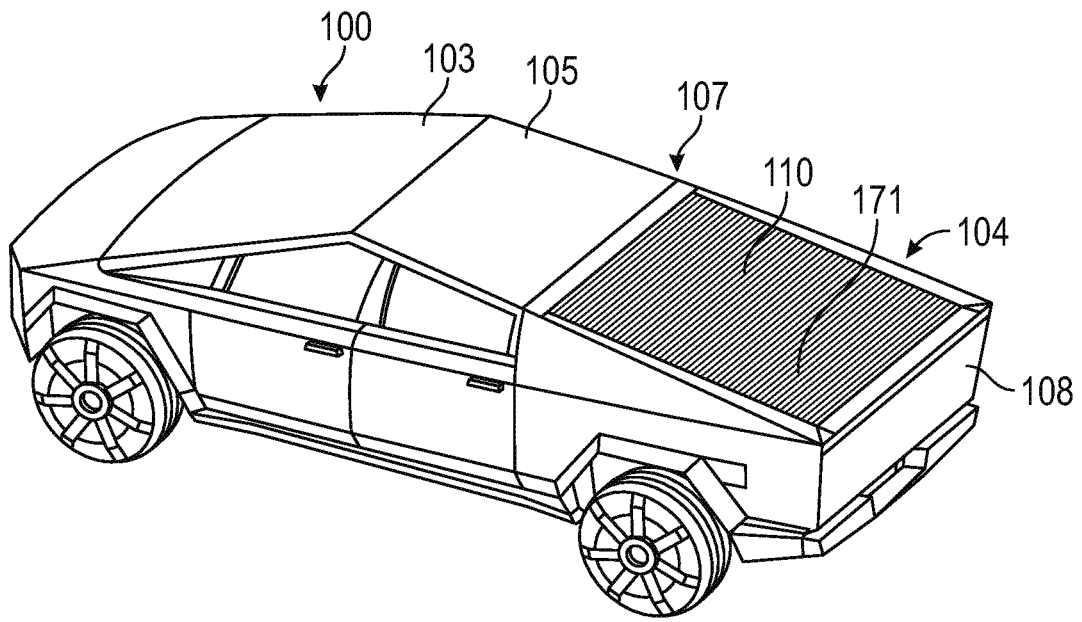
FIG. 1A shows a perspective view of an embodiment of a vehicle with a truck bed cover in a closed position, according to this disclosure.

FIG. 1A shows a vehicle 100 having cab 103 and a bed 104. The cab 103 includes an angled roof 105 that slants towards the bed 104 in this embodiment. In one embodiment, the angled roof 105 covers a portion of the passenger compartment of the cab 103. Covering the bed 104 is a tonneau cover 110 according to this disclosure. As shown, the tonneau cover 110 can be deployed to completely cover the truck bed, extending fully from a rear portion 107 of the cab 103 to a tailgate 108 of the vehicle 100. As shown, the cover 110 provides a relatively smooth and planar surface running along the same angle from the angled roof 105 to the tailgate 108. The transition from the angled roof 105 to the cover 110 is coplanar in that, when extended, the cover is approximately at the same angle as the slanted roof 105.

Figure 1B:
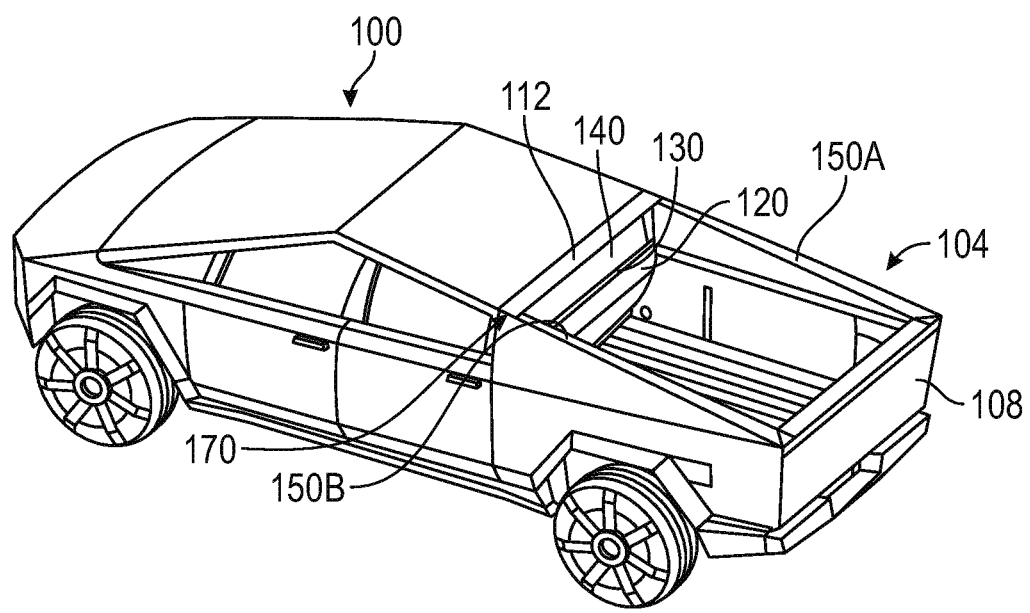
FIG. 1B shows a perspective view of an embodiment of a vehicle with a truck bed cover in an open position and showing the interior of the truck bed, according to this disclosure.

FIG. 1B shows the vehicle 100 with the tonneau cover 110 in a retracted position. In one embodiment, at the rear portion 107 of the cab 103 is a junction panel 112 where the cab 103 and the bed 104 meet. The junction panel 112 is configured as a small rearward facing panel that provides the upper boundary from where the cover 110 deploys. In an extended position, the cover 110 overlays an upper portion of the cover 110 so that rain or moisture will strike the junction panel 112 and move over the cover 110 and then off the back of the vehicle 100.

Below the junction panel 112 is an upward facing opening 130 that allows the tonneau cover 110 to be rolled or unrolled from underneath the vehicle 100. As the tonneau cover 110 moves from the retracted position to the extended position, it moves through the upward facing opening 130 and underneath the junction panel 112. The opening 130 is partially formed from a rear wall 120 of the cab 103. The rear wall 120 is used to protect the tonneau cover 110 in its retracted position from being hit and damaged by an object disposed in the bed 104. For example, when the vehicle 100 is being driven, the objects stored in the bed 104 may shift within the bed 104. The rear wall 120 prevents these objects from striking and possibly damaging the retracted tonneau cover.

As can been seen in FIG. 1B, in one embodiment, the tonneau cover 110 can be retracted completely into the opening 130 so as to be stored completely behind or below the rear wall 120. In one embodiment, the tonneau cover 110 is stored in or below the opening 130 or in a structure disposed between the cab and the bed of a vehicle. For example, the tonneau cover 110 may be retracted with a front section of the tonneau cover 110 being stored below a rear cab window 140 of the vehicle 100 so that it does not impede the rear view out of the cab 103 by the driver. This capability allows the driver to look through the rear cab window 140 when the tonneau cover 110 is in a retracted position (e.g., rolled and stored as described above). This allows the driver to have visibility into the bed 104 from the cab 103. This also allows a person loading cargo into the bed 104 to be able to look inside of the cab through the rear cab window 140. When in a retracted or stored position, the tonneau cover 110 is rolled and stored below the junction of the cab 103 and bed 104 as will be described in more detail below.

As the tonneau cover 110 is deployed, each slat within the cover moves on rollers upward within a set of side channels or rails 150A, 150B from the opening 130 upwards and over the bed 104.

As shown in FIGS. 1A and 1B, the channels 150A/150B run along the upper side edges of the truck bed, which are slanted at a downward angle, being higher near the cab 103 and lower near the tailgate 108. Thus, when the tonneau cover 110 is deployed to cover the bed 104, it is slanted downward at an angle that matches the angle of the angled roof 105 and towards the tailgate 108. This slanting allows water, snow, dirt, ice and other outdoor elements to run down the tonneau cover 110 and off the vehicle 100, thereby minimizing the weight on the tonneau cover 110 and vehicle 100 due to such outdoor elements and improving the performance of the vehicle 100. In one embodiment, the transition from the rear of the tonneau cover 110 to the top of the tailgate 108 is a smooth transition, allowing water, snow, and the like to run down the cover and over the top of the tailgate 108.

Now turning to FIG. 2, as shown, the tonneau cover 110 in a retracted or stored position forms a coil at a location behind the passenger compartment of the cab 103. The tonneau cover 110 slides down below the level of a rear cab window 140 at the end of the bed 104 so that a driver can see out the rear cab window 140 when the tonneau cover 110 is in the retracted or stored position. In one embodiment, a central motor (shown in FIG. 3) turns to unwind the tonneau cover 110 so that it rolls down across the top of the bed 104, and within the channels 150A/150B (on each sidewall of the bed 104).

FIG. 2 further illustrates the travel that the tonneau cover 110 undertakes as it unwinds from the location below the cab 103 and rolls out from the forward portion of the bed 104 to the rearward portion of the bed 104.

It should be realized that the configuration of the motor and tonneau cover as shown in FIG. 2 is not the only configuration that would allow the cover to slide over the bed. For example, the motor that is connected to the rolled tonneau cover may connect to a pulley system which pulls on a cable that attaches at the distal end of the tonneau cover 110 and helps pull the tonneau cover 110 out of the coil and over the bed 104. Thus, movement of the motor would pull on the cable, which would pull the cover into either the retracted or extended position depending on the direction of movement of the motor.

Figure 3:
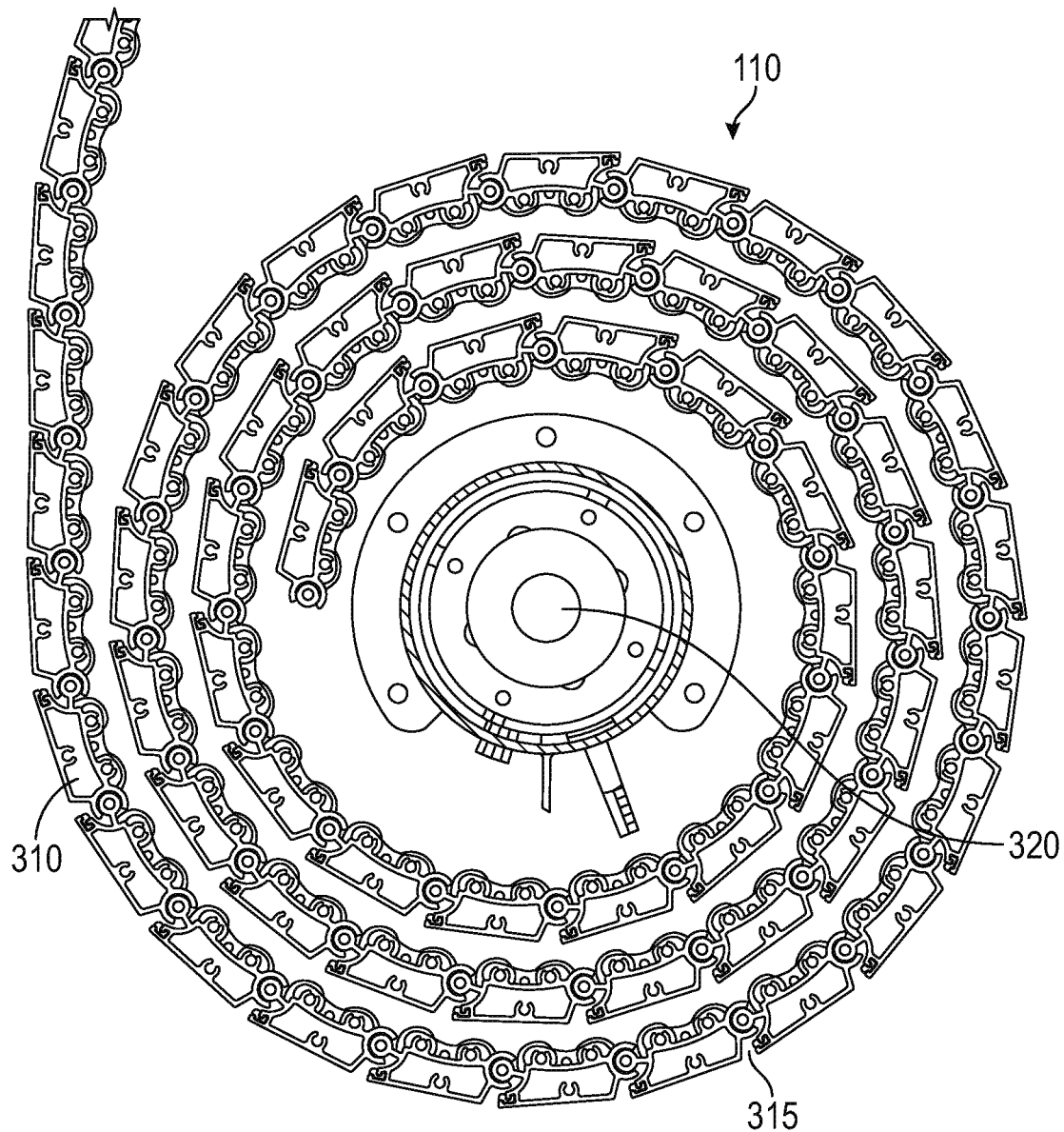
FIG. 3 shows a side, cross-sectional view of an embodiment of a truck bed cover in a coiled position and central motor, according to this disclosure.

FIG. 3 shows a side cross-sectional view of one design of the coiled formation of the tonneau cover 110, wherein the tonneau cover 110 is made from a series of slats or movable portions 310 that are linked together in a flexible format, such that the tonneau cover 110 can be rolled around a central axis, where a motor 320 is located.

As discussed above, each side edge of the tonneau cover 110 slides inside of channels 150A/150B, and is put in motion by the motor 320 that turns to move the tonneau cover 110 out of the opening 130, and over the bed 104.

In one embodiment, the tonneau cover 110 may be made from a series of movable portions 310, with each movable portion 310 having a set of bearings (not shown) attached to each side and configured to fit within the channels 150A/150B. Each movable portion 310 is linked to its adjacent movable portion 310 by a flexible linkage 315 that allows the cover to roll up and also be extended along its track.

In one embodiment, the motor 320 that controls the position of the tonneau cover 110 may be configured to wind, or unwind the tonneau cover 110 as it travels across the top of the bed 104 in the channels 150A/150B within the upper edges of the bed 104. In one embodiment, when the motor 320 turns in one direction, the tonneau cover 110 is pushed out of the opening 130 and unwound as it moves from the cab 103 towards the tailgate 108 of the bed 104. When the motor 320 turns in the opposite direction, the tonneau cover 110 is pulled back into its stored position below the cab 103.

In one embodiment, the motor 320 can directly control the movement of the tonneau cover 110, increasing the speed of the movement relative to when there is any intervening part between the motor 320 and the tonneau cover 110 for the control of the movement of the tonneau cover 110. In one embodiment, a drive assembly is packaged coaxially within the center of the spiral roll of the tonneau cover 110 in the retracted position shown in FIG. 3. In one embodiment, the motor 320 is connected to the tonneau cover 110 via a central rotating drum with a plunging rod and a linear ball bearing assembly mounted orthogonally onto the drum. The plunging rod is attached to a hinged brace which in turn drives the connected movable portion 310. In one embodiment, the motor 320 can rotate clockwise and counterclockwise at a desired speed. In an alternate embodiment, a pair of motors with a profiled wheel can rotate clockwise or counterclockwise at a desired speed. In one embodiment, the profiled wheel includes toothed features which can engage with roller shafts attached to the movable portions 310, and push them out of the opening 130 for deploying the tonneau cover 110 or pull them into the opening 130 for retracting the tonneau cover 110.

It should be realized that many different mechanisms could be used to open and close the tonneau cover 110 from its position below the cab 103 to an extended position covering the bed 104. Because the tonneau cover 110 is integrated into the vehicle 100 and not attached after manufacture, it can provide strong weather resistant seals whether in the open or the closed position.

To open or close the tonneau cover 110, a user may press an activation button 170 within or outside of the cab 103. In one embodiment, the activation button 170 is on top of one of the channels 150A/150B located adjacent to the bed 104. Alternatively, the user may insert a key into a keyhole located on an external portion of the vehicle 100. In an alternate embodiment, the vehicle 100 may have wireless access, and the tonneau cover 110 may be opened or closed using a wireless device, such as a cellular telephone, which can be used to access an application program configured to control the movement of the tonneau cover 110. In another embodiment, the cab or bed 104 may include a display screen having a user interface with a programmed button that can be activated by touch detection to control the movement of the tonneau cover 110 from an open to a closed position. In one embodiment, the drive system associated with the movement of the tonneau cover 110 uses multiple systems for parallel safety measures. In one embodiment, one such system is driven primarily with two (2) microswitches confirming the specific open and the specific closed positions. In one embodiment, a high-resolution encoder constantly monitors the position of the tonneau cover 110. In one embodiment, the motor 320 is capable of providing a force-feedback function, which enables disabling power to the motor 320 at a specified application of force and therefore electrical current to the motor. In an alternate embodiment, an edge of the tonneau cover 110 is fitted with a multi-conductor pinch sensor which is able to pause the automatic movement of the tonneau cover 110 at any point in its routine travel when the sensor is activated. In another embodiment, the drive system associated with the movement of the tonneau cover 110 is based on either capacitive or tactile sensing technology, which is used to detect the presence of any obstacle in the travel of the tonneau cover 110. In one embodiment, such technology of the drive system can enable the tonneau cover 110 to have an auto-reversing capability through its entire operating range when an obstacle is detected. Such capability can protect the cargo and the tonneau cover 110 (and its system components) from damage. In one embodiment, a pinch sensor can be integrated into a carrier that is attached to the movable portion 310 closest to the tailgate 108.

In one embodiment, the tonneau cover 110 comprises solar electric cells 171 that are electrically connected to a photovoltaic charging system and battery. In one embodiment, the battery is the vehicle battery that powers the vehicle 100, which in one embodiment may be an electric truck. When the tonneau cover 110 is deployed to cover the bed 104 and the solar electric cells 171 that make up the slats are facing the sun, the battery within the electric vehicle can be charged by the solar electric cells 171.

Figure 4:
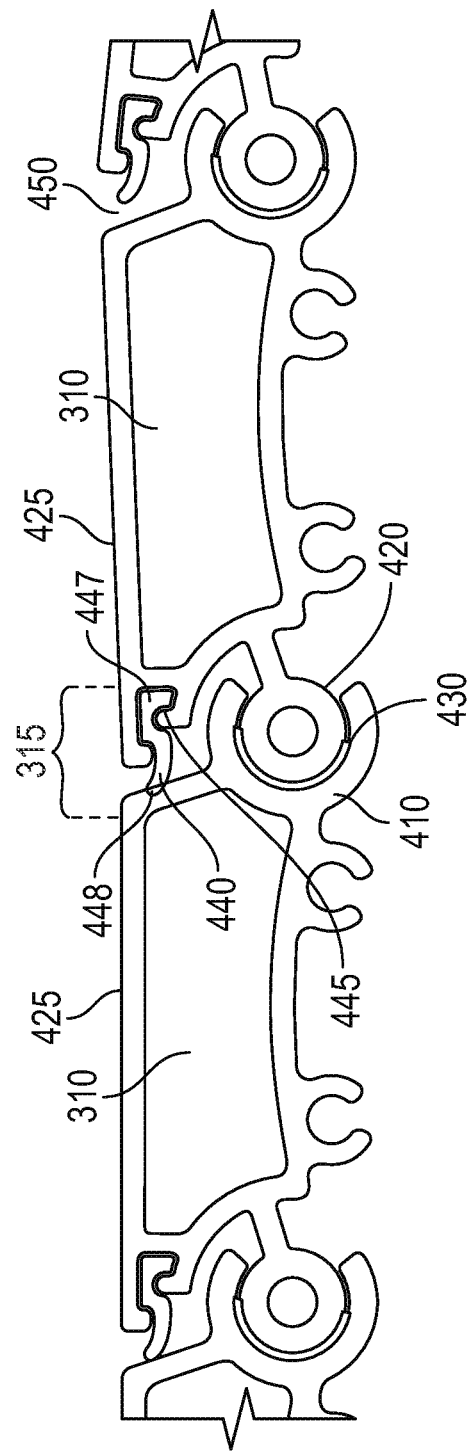
FIG. 4 shows a side, cross-sectional view of an embodiment of a plurality of linked slats or portions of a truck bed cover, according to this disclosure.

FIG. 4 shows one design of the movable portions 310 and linkage 315 of a tonneau cover 110 wherein the movable portions are linked together in a flexible format. A first half-moon shaped end 410 of each movable portion 310 can be connected to a second rounded end 420 to form the linkage 315. As shown, the first and the second ends 410 and 420 of two adjacent movable portions 310 can be linked in a flexible format, such that the first and the second ends 410 and 420 rotate or turn against each other to allow each movable portion 310 to flexibly link to each adjacent portion. As the movable portions 310 move with respect to one another, they close a gap 450 that forms between the two adjacent movable portions 310. As the tonneau cover 110 is in a rolled configuration, the gap 450 becomes wider, and as the tonneau cover 110 becomes deployed in a planar manner across the vehicle bed, the gap 450 becomes narrower. When the tonneau cover 110 is fully extended over the bed 104, the outer surfaces 425 of two adjacent movable portions 310 form a flattened position. This, as discussed above, can be useful in allowing any outdoor element to slide down the tonneau cover 110 and off the vehicle 100 based on the angled shape of the top of the bed 104. In one embodiment, the vehicle 100 may include a separate channel that is used for further routing of any water or outdoor element that needs to be routed away from the bed 104 and off the vehicle 100.

In one embodiment, the first and the second ends 410 and 420 are separated by a strip 430 that is located between the inner surface of the first end 410 and the outer surface of the second end 420. In one variant, the strip 430 is made of Polytetrafluoroethylene (PTFE) (e.g., Teflon), and sized to help reduce a noise level associated with the first and the second ends 410 and 420 rubbing against each other when the tonneau cover 110 or the vehicle 100 is in motion.

In one embodiment, the movable portions 310 that make up the tonneau cover 110 each include a weatherstrip 440 disposed in a channel 445 that runs the length of each movable portion 310. The weather strip 440 includes a mounting portion 447 and flexible contact portion 448. The mounting portion 447 engages and slides the weatherstrip 440 into the channel 445 in the movable portion 310. The flexible contact portion 448 protrudes into a gap 450 formed between each of the movable portions 310 and provides a water and weather-tight seal between each movable portion when the tonneau cover 110 is in the extended position. The weatherstrip 440 can lock into an adjacent movable portion 310, such that when the tonneau cover 110 is moved into a closed position, it is provided with a water impermeable surface. The weatherstrip 440 may be made from a durable and flexible material, such as rubber, to provide a weather tight seal between adjacent movable portions of the tonneau cover 110. When the tonneau cover 110 is placed into an extended position, the weatherstrip 440 is placed into a locked or closed position, and closes the gap 450 formed between two adjacent movable portions 310 and exerts a sealing pressure, thereby providing the water impermeable surface.

Figure 5B:
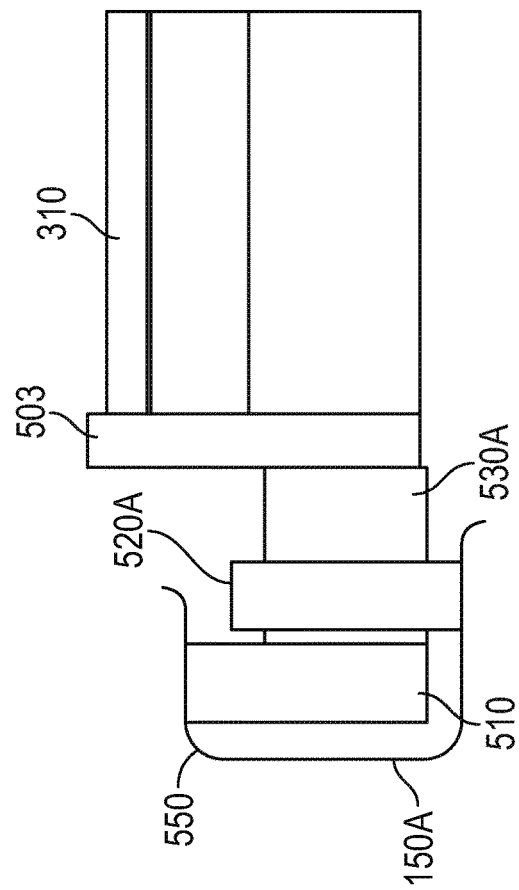
FIG. 5B shows a side perspective view of an embodiment of the rollers of FIG. 5A, according to this disclosure.
Figure 5A:
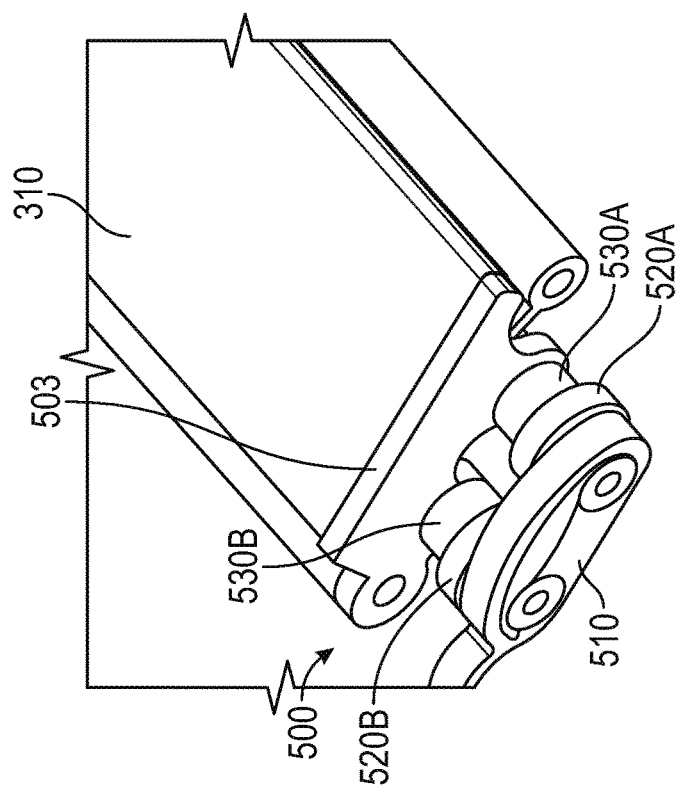
FIG. 5A shows a top perspective view of an embodiment of the rollers attached to an individual slat of a truck bed cover, according to this disclosure.

FIGS. 5A and 5B show diagrams of a side end 500 of a movable portion 310 of the tonneau cover 110. As shown, the movable portion 310 of the tonneau cover 110 includes an end cover 503 that mounts to the end of each of the movable portions 310. The end cover mates to the movable potion 310 on one side and provides mounts for two spacers 530A, 530B. In one embodiment, there are four (4) rollers connected to each movable portion 310, with each roller being rotatably mounted through a ball bearing to each slat. In one embodiment, the ball bearing is rated for 300 lbs of static load. Each side of the slat has a pair of ball bearings and rollers. In one embodiment, calculations and basic FEA (Finite Element Analysis) confirmed that the movable portions 310 are capable of handling abuse loads, such as for example from a 95$^{th}$ percentile male standing on the tonneau cover 110, or a specific amount of snow pack build-up on top of the tonneau cover 110, without any significant deflection beyond a specific threshold or any component failure.

Connected adjacent to each spacer 530A, 530B are rollers 520A, 520B that spin on ball bearings and which allow the movable portions to be slidably engaged with the tracks that run along the sides of the vehicle. Mounted adjacent to each of the rollers 520A, 520B is a flexible strip 510, which is positioned on the outer side of rollers 520A, 520B. In some embodiments, the rollers 520A, 520B are wheels or bearing/roller assemblies. The rollers 520A, 520B are used to move the movable portion 310 (and thus the tonneau cover 110) along and within the channels 150A/150B of the bed 104. As the rollers 520A, 520B move during motion of the tonneau cover 110, or stay in place within the channels 150A/150B when the vehicle 100 is in motion, the flexible strip 510 biases the rollers 520A, 520B to be held from moving up or down, and hitting the top or the bottom of the interior of the channels 150A/150B as can be seen more readily in reference to FIG. 5B. As shown, the flexible strip 510 is sized and positioned to press against an inside upper portion 550 of the track 150A. Such design can be useful to reduce a noise level associated with the moving of the rollers 520A, 520B inside the channels 150A/150B, or a stress level on the rollers 520A, 520B and other connected portions of the movable portion 310 or the channels 150A/150B.

The flexible strip 510 is configured to provide sufficient bias against the rollers 520A, 520B so that the rollers remain connected to the track 150A and aren't able to bounce up and down within the track as the vehicle is in motion. However, the flexible strip 510 does not provide so much of a bias that the rollers 520A, 520B are unable to roll within the track 150. In one embodiment, the flexible material is made from plastic, metal or other material that is flexible, but is capable of sliding within the interior of the track to provide the correct amount of bias on the rollers 520A, 520B.

The track 150A may be configured to be in any shape that holds the rollers and allows the cover 110 to extend and retract. For example, the track may be "U" shaped as shown in FIG. 5B. The track can also be more "V" shaped, or in a conical shape. In addition, the lower portion of the track may have features that allow it to channel water away from the interior of the truck bed. For example, in one embodiment, the lower portion of the track may have a channel configured to prevent water from entering the bed, and instead run down along the sides of the truck and out adjacent the tailgate. In other embodiments, the track may have orifices configured to allow water to exit the outer sides of the tracks and onto the roadway instead of the interior of the bed.

Computer readable program instructions for carrying out operations of this disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of this disclosure.

Aspects of this disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure.

The flowchart and block diagrams in the Figures illustrate the architecture, functionality, and operation of possible implementations of systems, methods, and computer program products according to various embodiments of this disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain exemplary embodiments may be combined and sub-combined in and/or with various other exemplary embodiments. Also, different aspects and/or elements of exemplary embodiments, as disclosed herein, may be combined and sub-combined in a similar manner as well. Further, some exemplary embodiments, whether individually and/or collectively, may be components of a larger system, wherein other procedures may take precedence over and/or otherwise modify their application. Additionally, a number of steps may be required before, after, and/or concurrently with exemplary embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of this disclosure.

The terminology used herein is for describing particular exemplary embodiments and is not intended to be necessarily limiting of this disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when this disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

This detailed description has been presented for various purposes of illustration and description, but is not intended to be fully exhaustive and/or limited to this disclosure in various forms disclosed. Many modifications and variations in techniques and structures will be apparent to skilled artisans, without departing from a scope and spirit of this disclosure as set forth in various claims that follow. Accordingly, such modifications and variations are contemplated as being a part of this disclosure. A scope of this disclosure is defined by various claims, which include known equivalents and unforeseeable equivalents at a time of filing of this disclosure.

What is claimed is:

1. A truck bed cover, comprising:
a plurality of movable portions, the plurality of movable portions having ends, and being linked together in a flexible format;
a roller mounted to each of the ends through a bearing and configured to fit within a channel of a truck bed and enable the plurality of movable portions to slidably engage with the channel; and
a flexible strip positioned adjacent to the roller and laterally outside of each of the ends such that when the roller is mounted into the channel, the flexible strip biases the roller to be held within the channel.

2. The truck bed cover of claim 1, wherein the flexible strip comprises a strip made of Polytetrafluoroethylene (PTFE), and is configured to reduce a noise level associated with the roller moving within the channel.

3. The truck bed cover of claim 1, wherein the truck bed cover is integrated in an electric truck configured to run off a battery pack stored within the electric truck.

4. The truck bed cover of claim 3, wherein the truck bed cover comprises a plurality of solar electric cells that are electrically connected to the battery pack; and
wherein the plurality of solar electric cells on the truck bed cover in a closed position is configured to recharge the battery pack, the closed position of the truck bed cover enabling the plurality of solar electric cells to face a sun.

5. The truck bed cover of claim 1, wherein truck bed cover is attached to a truck comprising a rear cab window; and
wherein the truck bed cover in an open position is configured to be stored completely within or below an opening between a cab and a truck bed of the truck, so as to not obstruct any view out the rear cab window from the cab.

6. The truck bed cover of claim 5, wherein the truck further comprises a wall between the opening and the truck bed, the wall configured to protect the truck bed cover in the open position and stored within or below the opening from being hit by an object disposed in the truck bed.

7. The truck bed cover of claim 5, wherein a movement of the truck bed cover is configured to be controlled by at least one of an activation button within or outside of the cab.

8. The truck bed cover of claim 5, wherein truck bed cover is attached to a truck comprising a rear cab window; and
wherein the truck bed cover in a closed position is configured to obstruct a view out the rear cab window from the cab.

9. The truck bed cover of claim 1, wherein the truck bed cover is configured to be rolled around a central axis using the plurality of movable portions.

10. The truck bed cover of claim 1, wherein at least one movable portion has a first end with a half-moon shape and/or a rounded shape.

11. The truck bed cover of claim 1, wherein a gap between adjacent movable portions is configured to become wider as the truck bed cover moves from a deployed to rolled configuration.

12. A truck bed cover, comprising:
a plurality of movable portions, the plurality of movable portions comprising ends, and being linked together in a flexible format;
a roller connected to a respective one of the ends through a bearing and the roller configured to fit within a channel of a truck bed to enable the plurality of movable portions to slidably engage with the channel; and
a flexible strip connected to the respective one of the ends on an outer side of the roller, the flexible strip configured to contact the channel to bias the roller in a downward direction and against a lower portion of an interior of the channel.

13. The truck bed cover of claim 12, wherein the flexible strip comprises a strip made of Polytetrafluoroethylene (PTFE), and is configured to reduce a noise level associated with the roller moving within the channel.

14. The truck bed cover of claim 12, wherein:
the truck bed cover is integrated in an electric truck configured to run off a battery pack stored within the electric truck;
the truck bed cover comprises a plurality of solar electric cells that are electrically connected to the battery pack; and
the plurality of solar electric cells on the truck bed cover in a closed position is configured to recharge the battery pack, the closed position of the truck bed cover enabling the plurality of solar electric cells to face a sun.

15. The truck bed cover of claim 12, wherein:
the truck bed cover is attached to a truck comprising a rear cab window;
the truck bed cover in an open position is configured to be stored completely within or below an opening between a cab and a truck bed of the truck, so as to not obstruct any view out the rear cab window from the cab; and
the truck further comprises:
a wall between the opening and the truck bed, the wall configured to protect the truck bed cover in the open position and stored within or below the opening from being hit by an object disposed in the truck bed.

16. The truck bed cover of claim 15, wherein a movement of the truck bed cover is configured to be controlled by at least one of an activation button within or outside of the cab.

17. The truck bed cover of claim 15, wherein truck bed cover is attached to a truck comprising a rear cab window; and
wherein the truck bed cover in a closed position is configured to obstruct a view out the rear cab window from the cab.

18. The truck bed cover of claim 12, wherein the truck bed cover is configured to be rolled around a central axis using the plurality of movable portions.

19. The truck bed cover of claim 12, wherein at least one movable portion has a first end with a half-moon shape and/or a rounded shape.

20. The truck bed cover of claim 12, wherein a gap between adjacent movable portions is configured to become wider as the truck bed cover moves from a deployed to rolled configuration.

* * * * *